May 6, 1941.  H. NERWIN  2,241,020
PHOTOGRAPHIC CAMERA
Filed May 18, 1940  10 Sheets-Sheet 2
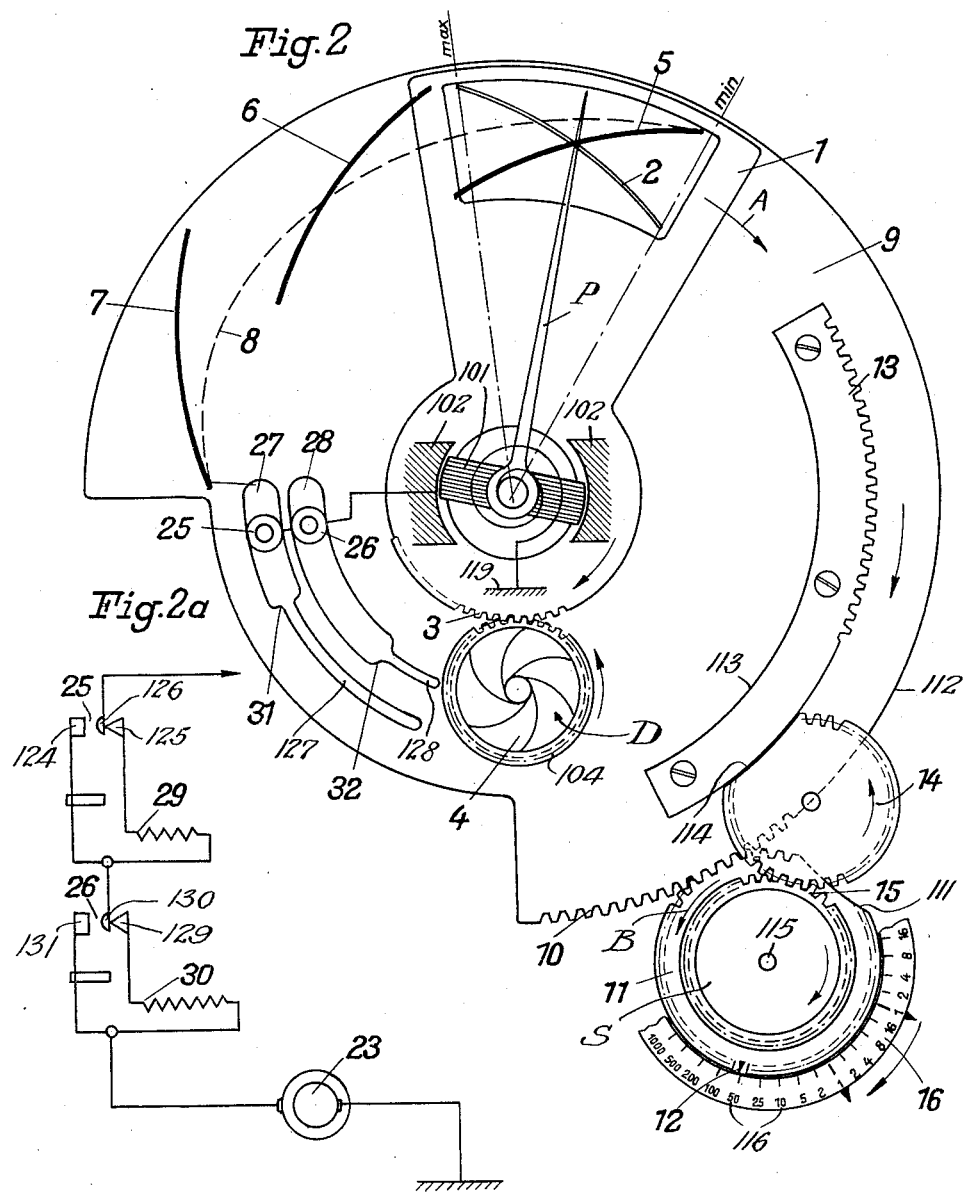
Inventor:
Hubert Nerwin
by Singer, Ehlert, Stern & Carlberg
Attorneys

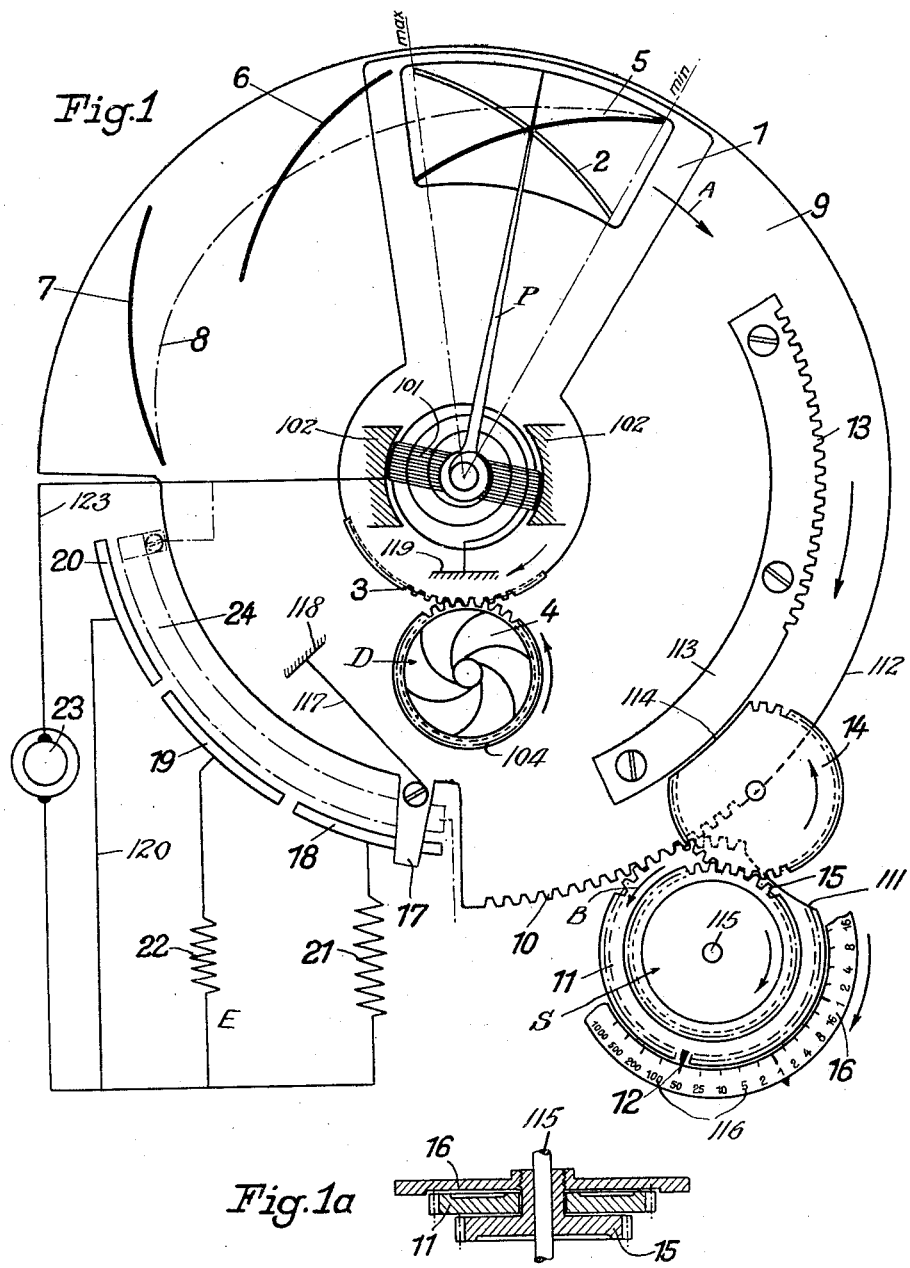

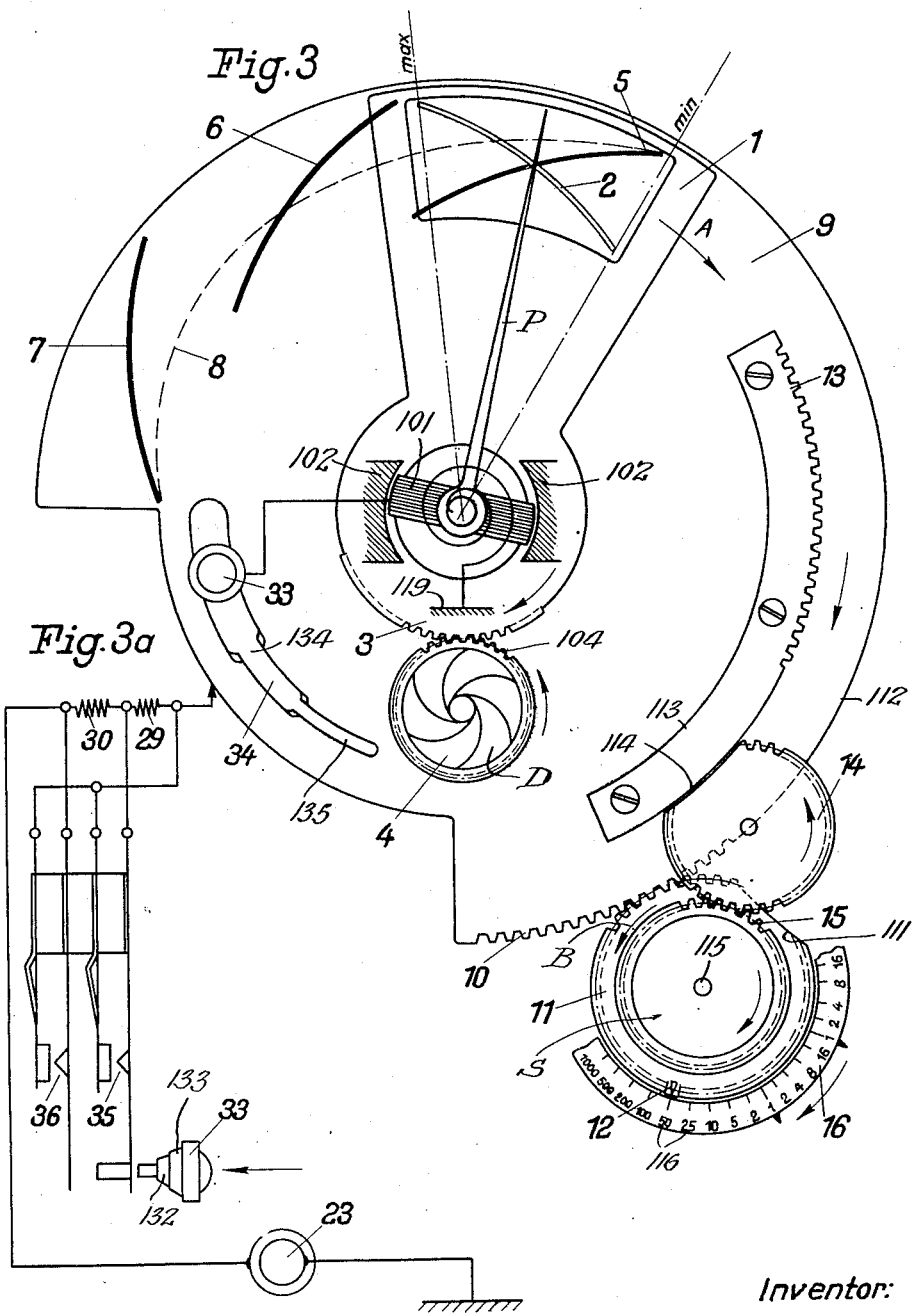

May 6, 1941.  H. NERWIN  2,241,020
PHOTOGRAPHIC CAMERA
Filed May 18, 1940   10 Sheets-Sheet 4
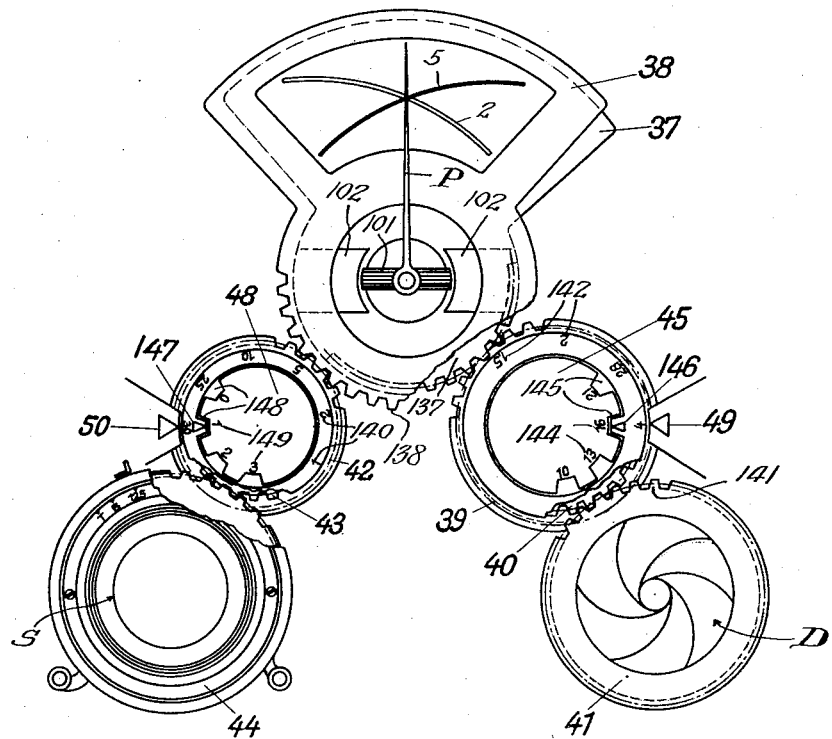
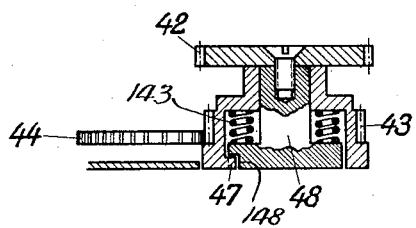
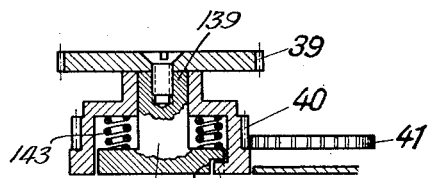
Inventor:
Hubert Nerwin
by Singer, Ehlert, Stern & Carlberg
Attorneys May 6, 1941.  H. NERWIN  2,241,020
PHOTOGRAPHIC CAMERA
Filed May 18, 1940   10 Sheets-Sheet 5
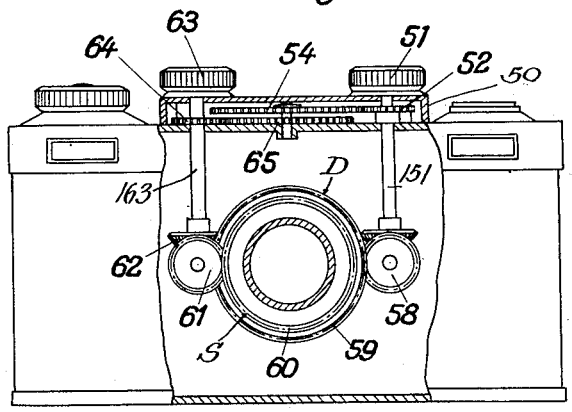
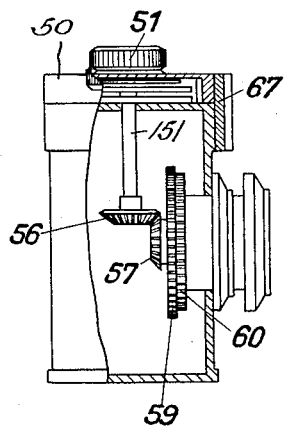
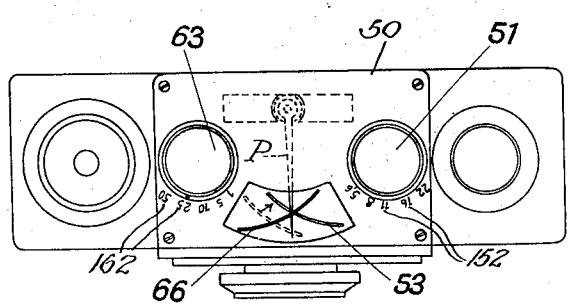
Inventor:
Hubert Nerwin
by Singer, Ehlert, Stern & Carlberg
Attorneys

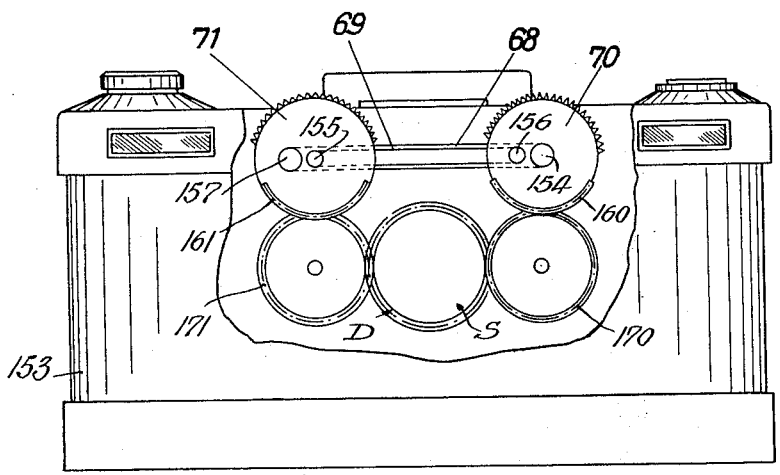

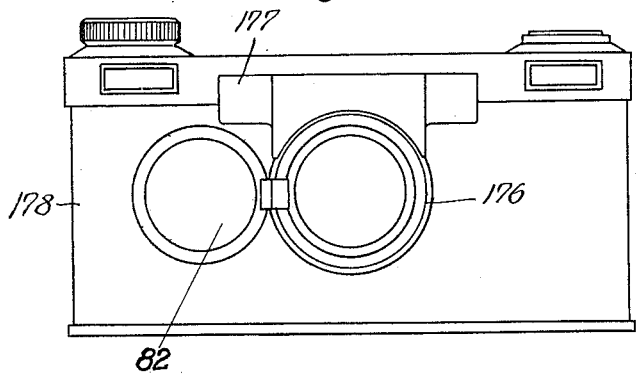
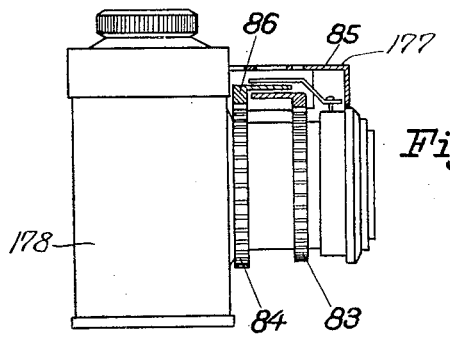
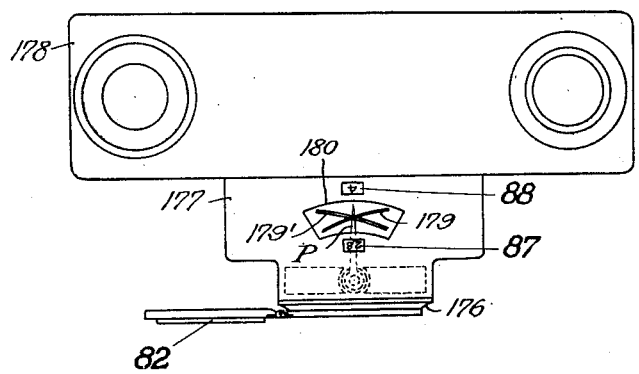

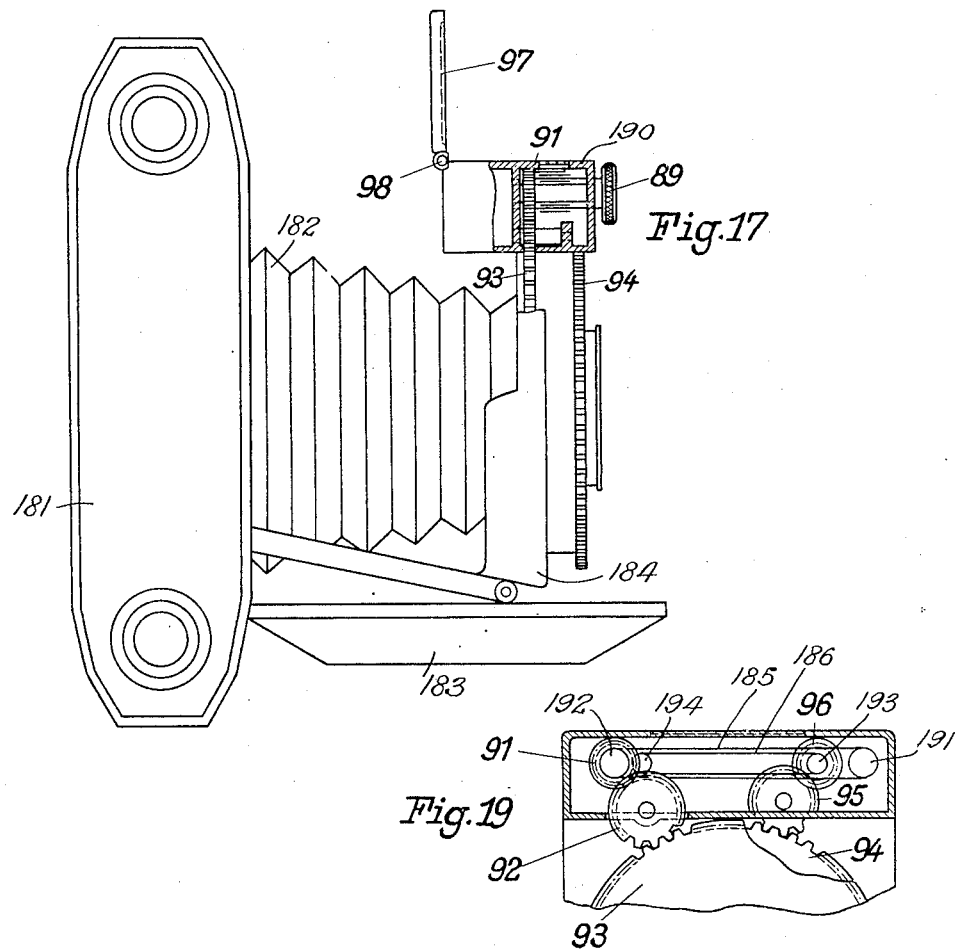

May 6, 1941. H. NERWIN 2,241,020
PHOTOGRAPHIC CAMERA
Filed May 18, 1940 10 Sheets-Sheet 10
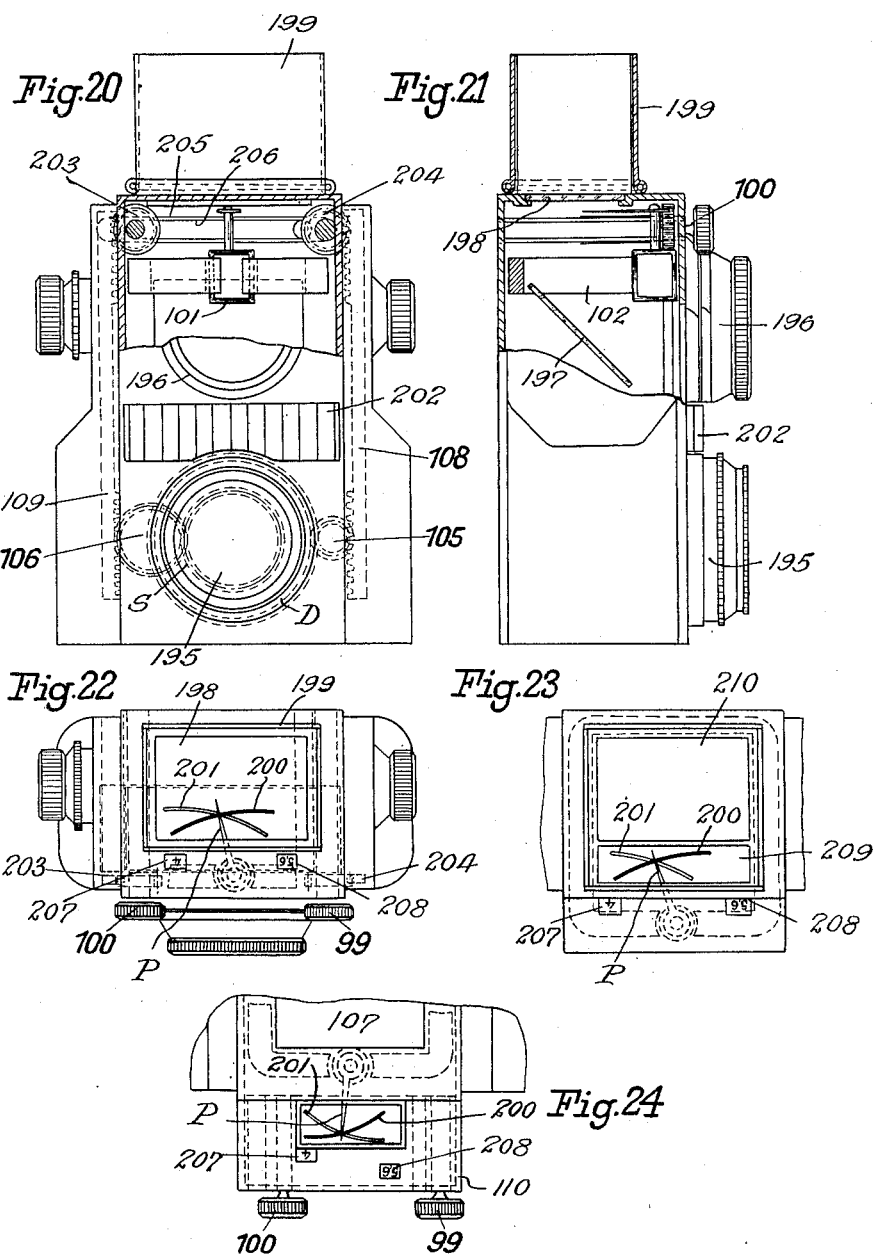

Patented May 6, 1941

2,241,020

UNITED STATES PATENT OFFICE 2,241,020

PHOTOGRAPHIC CAMERA

Hubert Nerwin, Dresden, Germany, assignor to Zeiss Ikon Aktiengesellschaft, Dresden, Germany Application May 18, 1940, Serial No. 335,937
In Switzerland November 15, 1939

34 Claims. (Cl. 95—10)

This invention relates to improvements in photographic cameras, and pertains to that type of cameras in which exposure control elements, as for instance, the shutter or diaphragm are adjusted in accordance with the indications of a photoelectric exposure meter associated with the camera. Where in the following specification and claims, a reference is made to a photographic camera, it is understood that this term also shall be applicable to motion picture cameras for which the invention also is of great use.

It had been proposed heretofore to provide means operatively related with the adjusting means for the exposure control elements for influencing the current generated by the photoelectric cell of the exposure meter.

These means were incorporated with the camera, for instance, in the form of variable resistances controlled by the exposure control elements and insertable into or removable from the circuit of the photoelectric exposure meter to thereby vary the current of the latter. It also had been proposed to associate a variable diaphragm with the photoelectric cell of the exposure meter and to adjust said cell diaphragm in accordance with the adjustment of the exposure control elements to reduce or enlarge respectively the effective area of the photoelectric cell.

Another known means for establishing correlation between the photoelectric exposure meter and the exposure control elements of the camera consisted of the provision of an indicator movable in accordance with the setting of the exposure control elements and adapted to be moved into a predetermined relation with the indicator of the exposure meter.

It is an object of the present invention to eliminate the insertion of a variable cell diaphragm into the exposure meter, and it is also an object of the invention to eliminate or reduce at least the use of electric resistances in the circuit of the photoelectric exposure meter since upon long continued use of resistances, inaccuracies may occur in these adjustments.

It is, furthermore, an object of the invention to provide a camera with a photoelectric exposure meter in which indicator marks associated with the exposure control elements are moved to predetermined relation with the indicator of the exposure meter and to predetermined relation with each other.

It is, furthermore, an object of the invention to provide a camera in which indicator marks associated with exposure control elements and the indicator of the photoelectric exposure meter are moved to optical registration with each other, namely, to a position in which the point of optical intersection of the indicator marks for the exposure control elements also is in optical registration with the indicator of the exposure meter.

It is, therefore, also an object of the invention to provide a camera associated with a photoelectric exposure meter having an indicator which is affected by the light conditions, and arranging indicator marks associated with the exposure control elements within the field of movement of the exposure meter indicator, whereby the position of the indicator marks associated with the exposure control elements and the position of the exposure meter indicator can be read at a glance, as contrasted with cameras in which the adjustment of the exposure control elements is to be read at a point on the camera remote from the field of movement of the exposure meter indicator.

It is, furthermore, an object of the invention to provide in association with a photographic camera, an exposure meter having an indicator movable with a smaller amplitude of movement than heretofore in use and to provide in association with the exposure control elements indicator marks adapted to be placed into predetermined relation with each other and with the exposure meter indicator within the reduced field of movement of said exposure meter indicator. It is, furthermore, an object of the invention to combine with the indicator marks of the exposure control elements circuit control elements for the current of the photoelectric exposure meter and to adjust automatically the circuit control elements in accordance with the adjustment of the indicator marks for the exposure control elements so as to eliminate the necessity of separately actuating the circuit control elements of the exposure meter and the exposure control elements to bring the indicator marks associated therewith to the desired relation with each other and with the exposure meter indicator.

With these and numerous other objects in view, a number of different embodiments of the subject matter of the invention are illustrated in the accompanying drawings, and are described in the following specification:

Fig. 1 is a diagrammatic illustration of one embodiment of the invention;

Fig. 1a is a detail sectional view of elements pertaining to the embodiment of Fig. 1;

Figs. 2 and 2a are a diagrammatical illustration of a modified embodiment and the pertaining wiring, respectively;

Figs. 3 and 3a are a diagrammatic illustration of a further embodiment and the pertaining wiring diagram, respectively;

Fig. 4 also diagrammatically illustrates an additional embodiment of the invention.

Figs. 5 and 6 are sectional detail views of different portions of the mechanism diagrammatically illustrated in Fig. 4;

Fig. 7 is a front elevation and partly section of a miniature camera to which a device for controlling the exposure has been applied, said device again being embodied in a structure different from any of the embodiments of Figs. 1 to 6.

Fig. 8 is a side elevation and partly section of the embodiment illustrated in Fig. 7;

Fig. 9 is a top plan view of the same.

Figure 12:
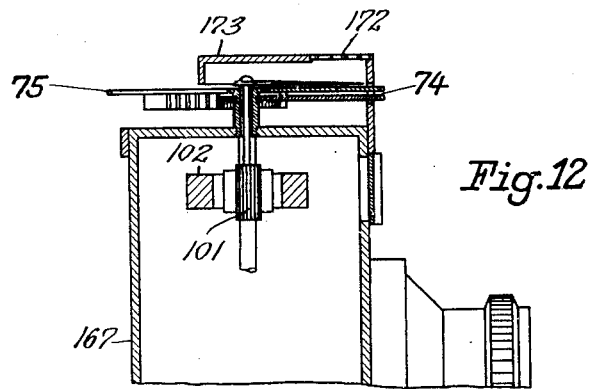
Figure 13:
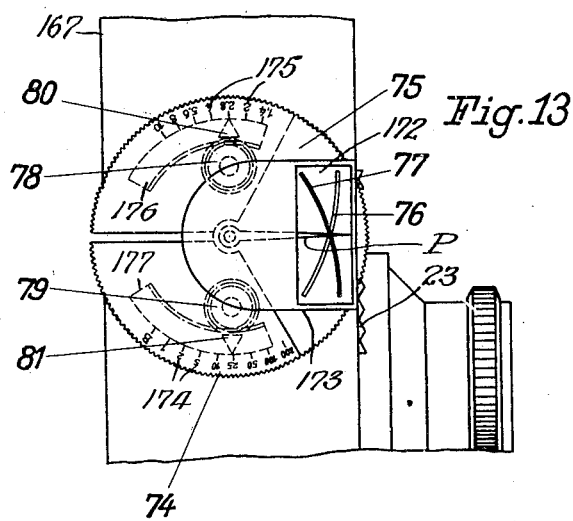

Fig. 10 is a partial front elevation and section of a camera, including a modified embodiment of the invention, this embodiment also being shown diagrammatically;

Fig. 11 is a top plan view of the same;

Fig. 12 is a partial side elevation and section of a fragmentary assembly of setting means for the control elements;

Fig. 13 is a diagrammatic fragmentary top plan view of the same;

Fig. 14 is a front elevation of a camera in which the photoelectric exposure meter is associated with the lens mount;

Fig. 15 is a top plan view of the same;

Fig. 16 is a side elevation and partly section of the same embodiment, the actuating means for the control elements being shown diagrammatically only;

Fig. 17 is a side elevation and partly section of a bellows camera in which the photoelectric exposure meter is combined with the actuating means for the exposure control elements in the manner of the present invention;

Fig. 18 is a top plan view of the same;

Fig. 19 is a vertical fragmentary section through indicator elements and actuating means, as disclosed diagrammatically in Figs. 17 and 18;

Fig. 20 is a fragmentary front elevation and partly section of a different type of camera showing a modified structure in which the adjustment of the exposure control elements is associated with the exposure meter;

Fig. 21 is a side elevation and partial section of the same;

Fig. 22 is top plan view thereof, the control elements and exposure meter being shown diagrammatically only;

Fig. 23 is a fragmentary top plan view of a modified portion of the camera illustrated in Figs. 20 to 22, showing a different arrangement of the indicators with respect to the finder screen, and Fig. 24 is a fragmentary top plan view of another embodiment of the observation window through which the position of various indicators may be ascertained.

In the diagrammatic illustrations of Figs. 1 to 4 inclusive, the shutter adjusting means and diaphragm adjusting means are shown out of axial alinement although it is obvious that shutter and diaphragm being in most instances axially alined with each other, the mechanisms for adjusting these exposure control elements will in actuality occupy a relation different from that illustrated in these figures. It should also be noted here that the invention is applicable to shutters which move in the focal plane of the lens or very closely adjacent to the plane of the film as well as to shutters which may be positioned within the lens mount itself and form a part thereof.

The exposure control elements are formed in Fig. 1 by the diaphragm D and the shutter S. Each of these exposure control elements is adjustable in a known or preferred way. The photoelectric exposure meter E comprises the photoelectric cell 23, and the movable system of which the rotary coil 101 between the poles of magnet 102 are the principal parts. Conduction connectors between the cell and the coil complete the circuit. The movable coil is associated with an indicator.

The diaphragm D shown in Fig. 1 as comprising a multiple blade iris 4 is provided with a gear rim 104. This gear is in engagement with a gear portion 3, pertaining to or actuated by a sector shaped element 1 associated with the rotatable coil 101 of the exposure meter.

Another member 9 shown here as being likewise rotatable about the axis of the coil 101 is operatively connected with the other exposure control element, namely, the shutter S. A circumferential portion of the movable member 9 is provided with gear teeth 10 in engagement with a gear 11 which by its rotation effects in any desired way the adjustment of the shutter S to the selected speed. The speed to which the shutter is set can be ascertained from the position of an indicator mark 12 on gear 11 with respect to a scale 16 provided with a plurality of speed indication marks 116.

Upon rotation of the movable member 9 in direction of the arrow A, Fig. 1, the gear 11 will also be actuated in direction of arrow B to move the indicator mark 12 with respect to the stationary indicator scale 16 and the shutter will be set to the corresponding speed by means (not shown) which are not of importance for the invention.

The series of teeth 10 on the movable member 9 extends over a circumferential portion only, while the remainder of the circumferential portion is smooth. The gear 11 actuated by the gear portion 10 is a mutilated gear. It is provided with a concave recess 111 at its circumference which enters into engagement with the smooth circumferential portion 112 of the movable member 9 after the gear portion 10 thereof has passed beyond engagement with the tooth portion of gear 11. During continued rotation of the movable member 9, the gear 11, therefore, is locked against rotation.

The rotatable member 9 also carries an arcuate rim 113 provided over a portion of its circumference with teeth 13. The teeth of the arcuate rack 113 are adapted for engagement with the teeth of another mutilated gear 14 which upon being rotated, actuates a gear 15 rotatable about the axis of the shutter speed setting shaft 115 and fixedly connected with the shutter speed scale 16.

From Fig. 1, it will also become apparent that in that part of movement in which the rotatable member 9 actuates the mutilated gear 11, the gear 14 is held stationary, owing to the engagement of the concave recess 114 thereof with the smooth portion of the arcuate rack 113. When, however, upon continued rotation of the movable member 9, the operative relation between its gear teeth 10 and the gear 11 has ceased, and whilst the gear 11 is being locked against rotary movement, the teeth of the arcuate rack 13 enter into engagement with the gear 14 to rotate the same. In this manner the actuation of the gears 11 and 15 is a successive actuation, and simultaneous operation of these two means for setting the shutter to a selective speed is prevented.

One of the exposure control elements preferably is associated with the exposure meter to effect an alteration of circuit conditions in the same. In the embodiment illustrated in Fig. 1, the member 9 effective to set the speed of shutter S is provided with a projection 17 adapted to slide successively over the arcuate contact bars 18, 19, 20, which are shown to be severally connected with the photoelectric cell 23. Resistances 21 and 22 of unequal value are inserted in the connections extending from the contact bars 18 and 19 respectively, and it may be assumed that the resistance at 21 is greater than the resistance at 22, while the connection 120 leading from the contact segment 20 to the photoelectric cell 23 may be free of any inserted resistance. A flexible conductor 117 connects the conductive projection 17 of member 9 with the ground at 118, and the photoelectric cell 23 is connected with the movable coil 101 of the instrument through lead 123, which also is grounded at 119. Depending upon the photo energization of cell 23 the pointer P secured to coil 101 will be deflected, and this deflection also is controlled by the resistance of the circuit extending between the grounded points 118, 119. The value of the effective resistance in this circuit will depend upon the position of the conductive projection 17 of rotary member 9 in contact with any of the segments 18, 19 or 20. In the position shown in Fig. 1, the circuit contains the greater resistance 21, which will be replaced by the smaller resistance 22 when the projection overlies the segment 19, while upon arrival of the projection 17 at segment 20 both of the resistances will be eliminated.

It is obvious that instead of eliminating successively the resistances 21, 22 from the circuit of the photoelectric cell, the contact projection 17 may move over a resistance 24 which may have uniform or non-uniform resistance value in different portions but which is varied with the continuous adjusting movement of the member 9.

The rotary member 9 is in the embodiment shown in Figs. 1 to 3 constructed as a rotary transparent or translucent disc, carrying shutter speed indicator marks 5, 6 and 7 in the form of separate curves. In place of these separate indicator curves a single indicator mark 8, shown in dotted lines, may be provided thereon. The relation of the indicator or pointer P of the exposure meter to the indicator marks 5, 6, 7 or 8 on the member 9 associated with the exposure control element S of the camera therefore can be ascertained at a glance, regardless of the extent of actuation of either.

The sector-shaped member 1 associated with the other exposure control element D of the camera is likewise transparent or translucent, and is also the carrier of an indicator mark 2, also in the form of a curve.

The relation of the indicator or pointer P to the indicator marks of members 1 and 9 therefore is visible at any time, and to facilitate the reading it may be assumed that proper relation of these indicators is attained, when the pointer P crosses the other indicator marks at the point of intersection of the latter. The indicators can then be described as being in optical registration—the points of intersection register with each other.

The operation of this device, therefore, may be shortly described as follows:

The operator, for instance, selects an exposure time between $\frac{1}{1000}$ of a second, and one second by setting the adjusting member 9 until indicator mark 12 points to the selector value on scale 16. Upon exposing the photoelectric cell 23 to the light, the pointer P of the galvanometer will be deflected to assume a position in which it apparently intersects the shutter speed indicator 5. The sector 1 determining the adjustment of the diaphragm must then be set manually by the operator until the point of intersection of the pointer P and indicator 5 is in optical registration with that point at which the indicator 2 apparently intersects the pointer P. When the points are in optical registration, the diaphragm opening is the proper opening for an exposure time selected by the operator and under the light conditions then prevailing.

Should the operator consider the diaphragm stop the determining factor of the picture which he desires to take, he primarily adjusts the sector 1, and by the gearing 3, sets the diaphragm 4 to a diaphragm scale (not shown). Upon energization of the cell 23 by the light the pointer P will again be deflected. He then sets the member 9 until the point of apparent intersection between an indicator mark of this transparent member and the pointer P optically register with the point of apparent intersection between the indicator 2 of the transparent member 1 and the pointer P.

As long as the length of exposure is less than one second, the indicator scale 16 remains stationary while the mark 12 travels with respect to said scale. But if the shutter speed is set for an exposure of one second or more, the mark 12 remains stationary in that position to which it has been moved by the initial adjustment of member 9, and the indicator scale 16 then travels with respect to the stationary mark 12. This more extensive adjustment of member 9 moves the indicator 5 carried thereby out of the field of deflection of pointer P and moves the indicator lines 6 or 7 to a position accessible for observation within said field.

It will also be clear that any extensive adjustment of the shutter speed determining member 9 coincides with a reduction of the resistance in the circuit of the photoelectric exposure meter E. If the energization of the photo cell 23 owing to poor light is weak, the current in the circuit is strengthened by the greater movement of the member 9, and this greater movement automatically renders the gear sections 10 and 13 successively effective for setting the shutter S to longer exposure times.

From Fig. 1a it will be seen that the shutter speed indicator scale 16 is fixedly secured to that gear 15 which through the intermediary of gear 14 is actuated by the rack segment 13. This actuation occurs after the shutter speed adjustment member 9 has moved the mark 12 to the indicator scale mark of one second. The mark 12 then remains stationary and the further adjustment takes place as pointed out above.

In the modification illustrated in Figs. 2 and 2a, the mechanical cooperation of the transparent diaphragm adjusting sector 1 with the diaphragm 4 and of the transparent shutter speed setting member 9 with the shutter S is the same as in the first described embodiment. This embodiment differs from the first described embodiment solely through the manner in which resistances are inserted into or eliminated from the circuit of the photoelectric cell.

For this purpose the transparent shutter speed setting member 9 is shown to be provided with concentric arcuate slots 27, 28 in which current control mechanisms, as for instance, switches in form of push buttons 25 and 26, respectively, are located. When the illumination of the object is very strong and it is desired to utilize a relatively great resistance in the circuit of the photoelectric cell 23, the switches 25, 26 are in the position indicated in Fig. 2a, so that the current from the photoelectric cell has to flow through the resistances 30 and 29 in series connection to the coil 101 of the galvanometer. If, however, the illumination is of such intensity only that a longer exposure than one second may become necessary, the operator may successively actuate these push buttons. Upon clockwise rotation of the disk 9 to bring the indicator mark 6 thereon within the field of deflection of the pointer P, the shoulder 31 of slot 27 engages the switch 25 and may temporarily stop further rotation. The operator then actuates the switch 25 to establish conductive connections between the elements 126, 124 breaking the connection between 125 and 126. By this actuation the button 25 is depressed into the narrower portion 127 of slit 27; at the same time the smaller resistance 29 is eliminated from the circuit. If, owing to poor light conditions, even then the point of intersection of the pointer P and the indicator mark 6 should be beyond the field of deflection of the pointer, the disc 9 will be rotated further in the same direction to bring the indicator mark 7 into cooperation with the pointer P, whereby at the same time the slit 28 is moved far enough to cause shoulder 32 to strike switch 26. This switch may then be depressed into the narrow part 128 of the slot 28, which movement causes the contact points 129 and 130 to be separated, and the contacts 130, 131 to be connected.

Upon depression of this button 26, the button 25 still being depressed, the resistance 30 also is eliminated from the circuit, so that the current generated by the photoelectric cell 23 flows directly to the galvanometer coil 101 without having to pass through any additional resistances. The push buttons preferably are spring controlled to return automatically to their original position as shown in Fig. 2a, thereby reinserting the resistances into the circuit, when the disc 9 is turned in opposite direction.

While in the embodiment illustrated in Figs. 2 and 2a, the resistances 30 and 29 were disconnected from the circuit by manipulation of the push buttons 25, 26 through the operator, in the embodiment illustrated in Figs. 3 and 3a, the resistances 30 and 29 are automatically introduced and withdrawn from the circuit upon corresponding actuation of member 9. A single push button or circuit control element 33 is movably disposed within an arcuate slot 34 of the transparent or translucent shutter speed setting disc 9. The push button is provided with conical cam portions 132, 133 shaped to assure automatically the successive entrance of the button into the reduced portions 134, 135 of the slot, coincidentally with its axial successive displacement. The push button 33 is under the action of springs, not shown, which have a tendency to force the button 33 within the attenuated portions of the slot 34 to greater depth in proportion to the reduction of the width of these slot portions.

As shown in Fig. 3, with the push button 33 in the widest portion of the slot 34, the resistances 30, 29 are in the circuit of the photoelectric cell 23, rotation of the disc 9 in clockwise direction will move the reduced portion 134 of the slot 34 to the location of the push button 33, and owing to the action on the cam 132 thereon, the push button 33 will be depressed until the contact 35 is closed, thereby short-circuiting the resistance 29. Upon further rotation of the disc 9 in the same direction, the reduced portion 135 of the slot 34 will depress the switch 33 owing to its cooperation with the cam portion 133 still further to close thereby the contact 36 and eliminating thereby then both of the resistances 30 and 29 from the electric circuit.

In all other respects, the embodiments as shown in Figs. 2 and 2a, and in 3 and 3a, are the same as in the first described embodiment.

In Figs. 4, 5 and 6, another embodiment is diagrammatically illustrated in which the mechanism also takes into consideration additional factors determining the exposure time. These additional factors are, for instance, the sensitiveness of the film, or as it is usually termed, the speed of the film, and the conditioning of the effective light by filters or polarizers which may be positioned in front of the lens. It is obvious that a film of higher sensitiveness will with a predetermined selection of stop aperture require a shorter exposure than a film of lower speed. On the other hand, assuming the light conditions to be unaltered, the insertion of a filter or polarizer between the lens and source of illumination may have the effect of requiring a longer exposure time than if there were no such obstruction positioned in front of the lens.

In the diagrammatic illustration of Fig. 4, the shutter speed setting mechanism and the diaphragm structure are again shown out of axial alignment for the sake of rendering the operation and mechanism clearer. The photo-sensitive cell (not shown) induces upon energization the deflection of the pointer P connected with the instrument coil 101.

The sector 37 of transparent material is provided with a gear portion 137 and with the indicator curve 2 for cooperation with the pointer P. The gear portion 137 meshes with an intermediate gear 39, to rotate through the gear 40 with which gear 39 may be coupled the rim 41 of diaphragm D having a gear sector 141.

The transparent sector 38 coaxial with pointer P and sector 37 carrying the indicator line 5 also is provided with a toothed portion 138 meshing with an intermediate gear 42 with which a second gear 43 may be coupled for rotation. The gear 43 cooperates with a coaxial gear 44 which constitutes the setting element for the shutter S.

The intermediate gear 39 forming part of the diaphragm adjusting mechanism is fixedly secured by means of stem 139 to a disc-shaped head 45 which at its circumference has a plurality of notches 145. The diaphragm setting gear 40 carries at its lower rim a single inwardly projecting tooth 46 adapted for insertion into any one of the notches 145 selectively.

The head 45 with its notches 145 also is provided with "film speed" indicator marks 144 in opposition to the notches. These marks are disposed on a part of the assembly which is readily accessible for observation. Upon shifting the gear 40 in axial direction against the pressure of the springs 143, rotation of the gear may be manually effected to bring the tooth 46 of gear 40 into engagement with any selected film speed notch 145 and indicator mark 144, while gear 39, however, remains stationary during this partial rotation of the gear 40. The cylindrical gear 40 is provided with "stop" indications 142 and it is obvious, therefore, that independently of any setting of the sector 37, any desired film speed indicator mark 144 may be moved to operative relation to an indicator 146 on gear 40. The intermediate gear 39 is not rotated during this adjustment, but solely the carrier 40 of the stop indicators 142. Hence if a certain stop indicator is to be placed into opposition to a fixed mark 49, to show to which opening the camera has been set, the adjustment will vary with different film speeds.

Similarly also, the addition of a filter, polarizer or the like to the lens may be taken into consideration upon setting of the shutter speed. The transparent sector 38 engages with its gear rim an intermediate gear 42 which is fixedly connected to the disc-shaped head 48. Springs 143 normally couple the cylindrical gear 43 with the intermediate gear 42 and the disc head 48. This drum-shaped gear 43 having an inwardly projecting tooth may, however, be axially shifted to bring the tooth 47 thereon out of engagement with any of the notches 148 provided on the head 48, permitting thereby said drumshaped gear 43 with its tooth 47 and the index 141 thereon to be rotated manually, so that upon releasing said gear 43 to the action of the springs 143, the tooth 47 thereon may enter any selected notch 148 on the disc head 48. The latter is provided with indicators 149 showing values of filter factors. The end face of gear 43 also carries indicator marks 140 for determining the speeds of the shutter.

Any adjustment of the gear 43 when disconnected from the intermediate gear 42 obviously does not alter the position of gear 42. The shutter S is set to the desired speed by bringing the speed indicator mark 140 selected by the operator into opposition to a fixed mark 50. The arc over which the gear 43 has to be rotated for this purpose obviously will vary, depending upon the preceding adjustment of gear 43 with respect to the head 48 and its light value marks 149.

In use of the camera the operator may cause the pointer P to be deflected through the photo cell (not shown) in accordance with the light illuminating the scene to be taken. After having set the index marks 146, 147 to the film speed and light factor of his equipment, he then can rotate the sectors 37, 38 until optical registration of the pointer P with the intersection of the indicator curves 2 and 5 is established. The diaphragm D and the shutter S are then set to take the picture under the prevailing light conditions, considering at the same time the filter value as well as the film speed of his equipment. He may obviously also select a shutter speed, as he deems best and solely determine the diaphragm opening, and vice versa, by inducing optical registration of the indicator elements P, 2, 5.

Figs. 7, 8 and 9 illustrate a so-called miniature camera in which the improvements of the present invention are embodied. In this camera, the optical registration of the indicator elements P, 2 and 5, is observed on the top of the camera on which is mounted a shallow exposure meter casing 50. A button 51 preferably accessible from the top effects the adjustment of the diaphragm (not shown) for which purpose the stem 151 of the button carries within the casing 50 a gear 52 in mesh with an intermediate gear 54 which may be transparent and on which the diaphragm indicator mark 53 is disposed. The same button 51 upon rotating, also operates the bevel gearing 56, 57, the latter driving through the spur gear 58, Fig. 7, the disc or ring 59 by means of which the diaphragm, not shown, is adjusted to the desired stop. The relative opening of the diaphragm may be ascertained from stop indicator marks 152 readable from the top of the camera and with which a mark (not shown) on the button cooperates.

Similarly also, the shutter speed adjusting button 63 turns the pinion 64 for rotating the transparent carrier 65 of an indicator mark 66 within the housing 50. Here also the stem 163 of the button 63 drives through a bevel gearing 61, 62, setting ring or disc 60 for the shutter. The exposure time to which the button has been set is accessible for observation by means of speed indicator marks 162.

The operation is as follows:

The user of the camera may arbitrarily select, according to his judgement, one of the two factors which determine the exposure—either the shutter speed or the diaphragm opening. After having set, for instance, the shutter speed adjusting button 63 to the desired speed, the photoelectric cell 67 at the front of the camera is exposed to the light reflected from the object to be photographed. The pointer P of the instrument will then assume a certain position in the window of the photoelectric exposure meter. It will intersect the shutter speed indicator line 66 at a certain point. The operator now turns the diaphragm adjusting button 51 and thereby actuates the diaphragm adjusting mechanism until the diaphragm indicator line 55 shown dotted in Fig. 9 is moved, for instance, from the dotted line position to intersect the pointer at a point in optical registration with the point of intersection between the pointer and the indicator line 66. By rotation of the two adjusting members 51, 63, any shutter speed may be coordinated with some diaphragm opening without in any way altering the circuit of the photoelectric exposure meter. Whenever the points of intersection are in optical registration, the shutter speed and diaphragm opening are coordinated to the light conditions affecting the exposure meter.

The modification illustrated diagrammatically in Figs. 10 and 11 also shows a miniature camera casing 153 with which a photoelectric exposure meter is united. The carriers of the indicator marks or curves for shutter speed and diaphragm opening, respectively, are here shown as a pair of endless transparent bands or tapes 68, 69. These transparent flexible indicator carriers may be actuated by means of the finger wheels 70, 71, respectively, projecting through slots slightly above the top of the camera and provided with frictional finger engaging surfaces. Here also by suitable relative movement of the finger wheels 70, 71, the two tapes 68, 69 may be shifted independently relatively to each other to bring their indicator marks 158, 159, respectively, into optical registration with the pointer P of the exposure meter, not shown. These finger wheels are secured to shafts 154 and 155, respectively, which are rotatably supported in the camera casing 153. The transparent tapes 68 and 69 are trained over these shafts and additional parallel shafts 156, 157 of slightly smaller length.

The finger wheels 70, 71 are additionally provided with gear rims 160 and 161, respectively, for driving the intermediate gears 170, 171 by means of which the shutter speed setting and the diaphragm setting mechanisms (not shown) may be independently varied. Here also the coordination of diaphragm stop and shutter speed is indicated by observation of the optical registration through window 164. The tapes 68, 69 or parallel flexible endless carriers 165 and 166 trained over the same shafts 154, 155 may serve for moving indicator numerals past openings 72, 73 in the top wall of the camera housing to permit the operator to set either of these exposure control elements to convenient values.

Figs. 12 and 13 show a fragmentary vertical section and top plan view respectively of another modification of a miniature camera, whose casing is indicated at 167. The exposure meter comprises a photoelectric cell 23, a magnet and a galvanometer 101 with pointer P, all parts being shown diagrammatically and the circuit connections being omitted. Discs 74, 75 are mounted in axial alinement, one directly above the other in such arrangement that both of these transparent sectors may be actuated by the fingers of the same hand. These transparent setting discs or sectors are provided, adjacent their knurled periphery, with indicator marks 76 and 77 which may be brought into optical registration with the pointer P. The relation of these indicator elements can be observed through the window 172 of a short extension 173 of the camera casing 167. These transparent actuators 74, 75 for the exposure control elements, namely the shutter and the diaphragm (not shown), are provided with shutter speed indicators and diaphragm stop indicators 174, 175 respectively, also in a position adapted to be observed from the top of the camera. They are variable in their position with respect to stationary indicators 80, 81 to permit the operator to set either one of the transparent actuators 74 or 75 selectively to a desired speed or a desired diaphragm opening respectively.

Each of the transparent actuators 74, 75 is provided in the embodiment illustrated on its lower face with an arcuate gear segment 176, 177 respectively adapted for driving engagement with pinions 78, 79 respectively, and these pinions again are in operative engagement with other gear elements, not illustrated, for effecting thereby the adjustment of the shutter to a predetermined speed or of the stop respectively.

The operator may expose the photoelectric cell to energization and then with the fingers of the same hand set the two transparent actuators 74, 75 until optical registration of the indicator elements P, 76, 77 can be observed. This condition of the indicator elements assures the proper correlation of the shutter speed to the diaphragm opening at the prevailing light.

The embodiment of the invention, as illustrated in Figs. 14, 15 and 16, is distinguished from the embodiments illustrated heretofore by the mounting of the photoelectric exposure meter in association with the lens mount which may be exchangeably secured in any desired way to the camera casing. The photoelectric cell 82 is in this instance constructed in the form of a cover of a size to close the front opening of the lens mount 176 so as to present the photosensitive material to the light reflected from the object whenever this cover is moved to the open position illustrated in Figs. 14 and 15. The cell 82 upon energization causes the pointer P to be deflected in a known way, similar to the manner described above. The actuators for the adjusting mechanism of the diaphragm and of the shutter are constructed as gears 83 and 84 respectively which are accessible for manipulation whenever the improved lens mount and photoelectric exposure meter are secured in operative position. A small housing 177 located on the camera casing 178 above the lens mount serves for slidably supporting rack bars 85 and 86 having transparent flanges which are provided with the indicator marks 179, 179', as shown in Fig. 15. It is obvious, therefore, that upon rotation of either of the manually operable gears 83 and 84, not only the pertaining part of the lens mount, namely, the shutter or the diaphragm (not shown) may be set directly to the desired position, or through some transmission elements (not illustrated), but this variation of the position will be indicated by the position of the indicator marks P, 179, 179', which can be observed through a window 180 in the auxiliary housing 177. Through additional windows 87, 88 provided in the top of the housing 177 the customary numerical values may be read, which indicate shutter speed or stop, and which also are applied to the rack bars 85, 86.

Any rotary adjusting movement of the gears 83, 84 will induce a rectilinear reciprocating movement of the rack bars 85, 86 in the extension 177 and may, therefore, bring the indicator marks 179, 179' pertaining thereto to optical registration with the pointer P of the instrument. In this structure, therefore, the entire arrangement is exceedingly compact and will permit the calibration of the indicator marks definitely with respect to the lenses contained in the exchangeable mount.

Whenever the lens mount is exchanged, obviously attention must be paid to the proper operative connection of the shutter trip mechanism with the speed setting segment of the adjusting device of the invention.

The other parts of the camera obviously may have any known or desired mechanism, and are not of importance for the invention.

While in the embodiments shown in Figs. 7 to 15, the mechanism for exposure control elements was shown in association with miniature cameras, the embodiments illustrated in Figs. 17 to 19 show an ordinary folding camera with a casing 181 and a bellows 182 adapted to be collapsed into the casing by swinging the cover 183 upwardly to closing position, while upon opening of the cover, the bellows is extended as it is well known in this art. The lens board 184 secured to the bellows is provided with manually operable gears 93, 94 for effecting the adjustment of the diaphragm ring, not shown, and the shutter timing device, not shown, respectively. The lens board also carries at the top a small housing 190 which is normally closed by the cover 97. The interior of the cover is provided with the photosensitive material adapted to set up a flow of electrons when struck by the light. The cover 97 is hinged to the housing 190 at 98. As shown in Fig. 19, the indicator carriers are provided in the form of endless tapes 185, 186 of transparent material, and the relative position of their indicator curves 187, 188 may be observed through a window 189 in the top of the auxiliary housing 190.

The pairs of shafts or rollers 191, 192 and 193, 194 over which the endless transparent tape carriers 185, 186 for the indicator marks are trained are arranged in the manner described with reference to Figs. 10 and 11, and they may be rotated by means of buttons 89 and 90 accessible from the front wall of the housing 190. Fig. 19 shows that pinions 92 and 95 are interposed between the pinions 91 and 96, respectively, on the actuating shafts 192, 193 for the carrier tapes and the large gears 93, 94, respectively, more directly associated with the exposure control elements. It is these intermediate pinions through which, by means of the operating knobs 89 and 90, the adjustment of the carrier tapes as well as the adjustment of the exposure control elements may be effected.

The embodiment illustrated in Figs. 20 to 24 inclusive shows the combination of this setting device for the exposure control elements of a camera in combination with a camera of the twin-lens type. The camera is equipped not only with the lens 195 for making the exposures but with a similar and correspondingly adjustable lens 196 projecting a picture upon a mirror 197 from which it is reflected upon a transparent screen 198 forming the bottom of a hood or housing structure 199 that normally can be folded on top of the camera to protect this finder screen 198. In this embodiment the relative position of the indicator marks 200, 201 actuated in accordance with the adjustment of the diaphragm stop or shutter timing mechanism (not shown) respectively are also observable through the transparent screen 198 which shows the picture produced by the finder lens 196.

The photoelectric cell 202 is shown positioned at the front wall of the camera between the two lenses while the annular magnet in whose field the galvanometer coil 101 is rotatably carried extends transversely through the camera casing approximately above the mirror 197 of the finder. Narrow compartments on the outer side of the lateral walls of the camera housing serve for slidably mounting in the interior thereof rack bars 108 and 109, which may be actuated by pinions 203, 204, respectively, carried on the rollers over which the endless tapes 205, 206 of transparent material forming the carriers of the indicator marks are trained.

The pinions 203, 204 are actuated and the indicator carriers 205, 206 are moved by means of rotary buttons 99, 100, respectively, at the front of the wall of the camera. Owing to the engagement of the pinions with the rack bars 108, 109, the gears 105 and 106 are adjusted. These gear elements serve in a known way for setting the exposure control elements, namely the diaphragm and the shutter. Here again the establishment of the optical registration of the indicator element P of the photoelectric instrument with the indicator marks 200, 201 on the endless carriers 205, 206 advises the user of the camera that lens and diaphragm have been adjusted to the desired coordination for the exposure at the light which energizes the cell 202.

Each of the carriers 205, 206 is additionally equipped with indicator numerals, designating stop openings and shutter speed, in the conventional way and readable through the openings 207, 208 in the top wall of the camera or finder.

In the embodiment illustrated in top plan view in Fig. 23, the field 209 in which the indicator marks 200, 201 are caused to appear is separated from the field 210 in which the picture projected by the finder lens can be observed. In other respects the embodiment of this Fig. 23 is the same as illustrated in Figs. 20 to 22, and several details are therefore not shown in Fig. 23.

The embodiment of Fig. 24 shows in a fragmentary top plan view that the entire finder field 107 is reserved for the projection of the finder picture by the reflector, and that the carriers for the indicator marks 200, 201 are movably located in a forward extension 110 of the finder housing. These tapes again may be actuated by the buttons 99, 100 as described above in connection with Figs. 20 to 22, and a suitable gear transmission, not shown, may again serve for operating the gear elements through which the position of the diaphragm and shutter setting mechanism is adjusted.

I claim:

1. In a photographic camera, the combination of a plurality of adjusting mechanisms for exposure control elements, a photoelectric exposure meter, a carrier for an indicator mark in each of said adjusting mechanisms, an indicating element associated with the photoelectric exposure meter and movable in proportion to the intensity of the light passing into the exposure meter, and means in said adjusting mechanism for moving said carriers to optical registration of the several indicator marks thereon and the indicating element of the exposure meter, whereby the relative adjustment of the exposure control elements is coordinated to the intensity of the light affecting the exposure meter.

2. In a photographic camera, the combination of a shutter timing mechanism, a diaphragm setting mechanism, an exposure meter, a carrier for an indicator mark in each of said mechanisms, an indicating element forming part of the exposure meter and movable thereby, and means in said mechanism for bringing the indicator marks on the carriers into optical registration with the indicating element of the exposure meter, whereby the shutter timing mechanism and the diaphragm setting mechanism are coordinated to the intensity of the light affecting the exposure meter.

3. In a photographic camera, the combination of a pair of adjusting mechanisms for exposure control elements, a photoelectric exposure meter, a pair of carriers of indicator marks, movement transmitting means between said carriers and the adjusting mechanisms respectively, and an indicating element forming part of the exposure meter and movable in proportion to the intensity of the light affecting the exposure meter, the carriers being movable independently of each other to mutual intersection and to a predetermined relation to the indicating element of the exposure meter.

4. In a photographic camera the combination of a pair of adjusting mechanisms for exposure control elements, a photoelectric exposure meter, a pair of carriers of indicator marks, movement transmitting means between the carriers and the adjusting mechanisms respectively, and an indicating element forming part of the exposure meter and movable in proportion to the intensity of the light affecting the exposure meter, the adjusting mechanisms being operable to move the indicator marks on the carriers to a predetermined relation with each other, and to a predetermined relation to the indicating element of the exposure meter, 5. In a photographic camera, the combination of a plurality of adjusting mechanisms for exposure control elements, a photoelectric exposure meter, a transparent carrier for an indicator mark in each of said adjusting mechanisms, an indicating element associated with the photoelectric exposure meter and movable in proportion to the intensity of the light passing into the exposure meter, and means in said adjusting mechanism for moving said carriers to optical registration of the several indicator marks thereon and the indicating element of the exposure meter, whereby the relative adjustment of the exposure control elements is coordinated to the intensity of the light affecting the exposure meter.

6. In a photographic camera, the combination of a plurality of adjusting mechanisms for exposure control elements, a photoelectric exposure meter, a carrier for an indicator mark in each of said adjusting mechanisms, an indicating element associated with the photoelectric exposure meter and movable in proportion to the intensity of the light passing into the exposure meter, and means in said adjusting mechanism for moving said carriers in planes parallel to each other to optical registration of the several indicator marks thereon and the indicating element of the exposure meter, whereby the relative adjustment of the exposure control elements is coordinated to the intensity of the light affecting the exposure meter.

7. In a photographic camera, the combination of a plurality of adjusting mechanisms for exposure control elements, a photoelectric exposure meter, a transparent carrier for an indicator mark in each of said adjusting mechanisms, an indicating element associated with the photoelectric exposure meter and movable in proportion to the intensity of the light passing into the exposure meter, and means in said adjusting mechanism for moving said carriers in planes parallel to each other to optical registration of the several indicator marks thereon and the indicating element of the exposure meter, whereby the relative adjustment of the exposure control elements is coordinated to the intensity of the light affecting the exposure meter.

8. In a photographic camera, the combination of exposure control elements, manually adjustable setting mechanisms for said elements, including carriers of indicator marks movable in parallel planes, an exposure meter, an indicator element for said exposure meter movable in a plane parallel to said other planes, and means for bringing said indicator marks into optical registration with said indicator element, whereby adjustment of all of said exposure control elements for the light condition affecting the exposure meter is indicated.

9. In a photographic camera, the combination of exposure control elements, manually adjustable setting mechanisms for said elements, including carriers of indicator marks movable in parallel planes, an exposure meter, an indicator element for said exposure meter movable in a plane parallel to the first named planes, and means forming part of said adjustable setting mechanisms for controlling the movement of said indicator element and for bringing said indicator marks to optical registration with said indicator element.

10. In a photographic camera, the combination of exposure control elements, independently operable adjusting mechanisms for said elements, transparent carriers of indicator marks movable by said adjusting mechanisms in parallel planes, a photoelectric exposure meter controlling an electric circuit in which it is located, an indicator element for said exposure meter movable in a plane parallel to said first named planes, and means forming part of said adjusting mechanism for moving said indicator marks and indicator element to optical registration and simultaneously altering the resistance in the circuit of said exposure meter.

11. In a photographic camera, the combination of exposure control elements, independently operable adjusting mechanisms for said exposure control elements, carriers of indicator marks rotatable by said adjusting mechanisms about one axis in parallel planes, an exposure meter, an indicator element for said exposure meter rotatable about the same axis in another parallel plane and means forming part of said adjusting mechanisms for rotating the carriers of the indicator marks to bring the latter to optical registration with the rotatable indicator element.

12. In a photographic camera, the combination of exposure control elements, independently operable adjusting mechanisms for said exposure control elements, carriers of indicator marks rotatable by said adjusting mechanisms, an exposure meter, a rotatable indicator element for said exposure meter, and means forming part of said adjusting mechanism for bringing the indicator marks to optical registration with the rotatable indicator element.

13. In a photographic camera, the combination of exposure control elements, independently operable adjusting mechanisms for said exposure control elements, carriers of indicator marks rotatable in parallel planes by said adjusting mechanisms, the indicator marks being located in planes at right angle to the axis of rotation, an exposure meter, an indicator element rotatable in another parallel plane at right angle to its axis of rotation, and means forming part of said adjusting mechanism for bringing the indicator marks to optical registration with said indicator element.

14. In a photographic camera, the combination of exposure control elements, independently operable adjusting mechanism for said exposure control elements, carriers of indicator marks movable by said adjusting mechanisms, a photoelectric exposure meter, a coil rotatable about a fixed axis and forming part of said exposure meter, and an indicator element actuated by said coil, the carriers of the indicator marks being rotatable about the rotary axis of the coil of the exposure meter, the indicator marks on said carriers being spaced from said axis to be in optical registration with said indicator element when the exposure control elements are adjusted in accordance with the light affecting the exposure meter.

15. In a photographic camera, the combination of exposure control elements, adjusting mechanisms for said exposure control elements, carriers of indicator marks movable by said adjusting mechanisms in parallel planes, an exposure meter, adapted to be energized by light and an indicator element for the exposure meter movable in another parallel plane, the exposure control elements being adjusted in mutual coordination and in coordination to the energization of the exposure meter when the indicator marks are in optical registration with the indicator element, the plane of movement of the indicator element being above the planes of movement of the carriers for the indicator marks.

16. In a photographic camera, the combination of exposure control elements, adjusting mechanisms for said exposure control elements, carriers of indicator marks movable by said adjusting mechanisms, an exposure meter, an indicator element for said exposure meter movable within a restricted field, at least one of the carriers having a plurality of indicator marks thereon, and means forming part of one of said adjusting mechanisms for moving one said plurality of marks to optical registration with an indicator mark of another carrier and with the indicator element of the exposure meter within the field of movement of the latter.

17. In a photographic camera, the combination of exposure control elements, adjusting mechanisms for said exposure control elements, carriers of indicator marks movable by said adjusting mechanisms, an exposure meter, adapted to be energized by light, and an indicator element for said exposure meter movable within a restricted field, the exposure control elements being adjustable for mutual coordination and for coordination with the energization of the exposure meter when the indicator marks of said carriers and the indicator element of the exposure meter are in optical registration within the restricted field.

18. In a photographic camera, the combination of exposure control elements, adjusting mechanisms for said control elements, carriers of indicator marks movable with said adjusting mechanisms, at least one of said carriers having a plurality of indicator marks thereon, an exposure meter energizable by light, an indicator element for said exposure meter movable in dependence of the energization of the exposure meter, and means for additionally controlling the movement of the indicator element of the exposure meter, the last named means being adapted to become operative upon movement of the carrier provided with a plurality of indicator marks for bringing any one of the marks thereon, the indicator mark on another carrier, and the indicator element, to optical registration.

19. In a photographic camera, the combination of exposure control elements, independently operable adjusting mechanisms for said control elements, carriers of indicator marks movable with said adjusting mechanisms respectively, at least one of said carriers having a plurality of indicator marks thereon, a photoelectric exposure meter, an electric circuit in which said exposure meter is located, an indicator element operable by the current in said circuit, a plurality of resistances in the circuit, and means for successively altering the relations of said resistances to said circuit upon actuation of one of said adjusting mechanisms and for bringing one of said indicator marks of the carrier having a plurality of marks thereon, another indicator mark and said indicator element, in optical registration.

20. In a photographic camera, the combination of exposure control elements, adjusting mechanisms for the same, carriers of indicator marks movable with said adjusting mechanisms respectively, the carriers being in the form of endless transparent tapes movable relatively to each other in parallel planes, an exposure meter, an indicator element for the exposure meter movable in a plane parallel to those of the tapes, and means forming part of said adjusting mechanisms for independently moving said tapes to bring indicator marks thereon into optical registration with each other and with the indicator element of the exposure meter whereby the coordinate adjustment of the exposure control elements with each other at the light conditions affecting the exposure meter is ascertainable.

21. In a photographic camera, the combination of exposure control elements, adjusting mechanisms for the same, means for actuating the adjusting mechanisms, variable transmission members interposed between said adjusting mechanism and said actuating means, means forming part of said transmission members for varying the positioning of said exposure elements in accordance with the variation applied to the transmission members, carriers of indicator marks movable with said adjusting mechanisms respectively, an exposure meter, an indicator element for said exposure meter, and means forming part of said adjusting mechanism for moving the carriers of indicator marks to bring the marks thereon to optical registration with the indicator element.

22. In a photographic camera, the combination of a shutter adjusting mechanism, a diaphragm adjusting mechanism, a film speed display means, settable in accordance with the speed of the film used, the film speed display means being connected with one of said adjusting mechanisms, a light factor display means, settable in accordance with light varying means on the camera, the light factor display means being connected with the other of said adjusting mechanism, carriers of indicator marks movable with said adjusting mechanisms respectively, an exposure meter, an indicator element movable with said exposure meter, and means forming part of said adjusting mechanisms for differentially moving the carriers of indicator marks to bring the marks thereon to optical registration with said indicator element, said last named means being controlled by the setting of said film speed display means and of the light factor display means respectively.

23. In a photographic camera, the combination of exposure control elements, adjusting mechanisms for the same, carriers of indicator marks movable by said adjusting mechanisms, an exposure meter, an indicator element for the same, means forming part of said adjusting mechanisms for moving the indicator marks to optical registration with said indicator element, said carriers of the indicator marks being rotatable about axes parallel to the axis about which said indicator element is rotatable.

24. In a photographic camera, the combination of exposure control elements, adjusting elements for the same, carriers of indicator marks movable by said adjusting mechanisms, one of said carriers at least, being provided with a plurality of indicator marks, a photoelectric exposure meter located in an electric circuit, an indicator element for the same, means for altering the resistance of the electric circuit of the photoelectric exposure meter in accordance with the movement of said carrier provided with the plurality of marks, and means forming part of the adjusting mechanism for moving the mark on said carrier, an indicator mark on another carrier and the indicator element of the photoelectric exposure meter to optical registration.

25. In a photographic camera, the combination of exposure control elements, adjusting mechanisms for the same, carriers of indicator marks movable by said adjusting mechanisms, a photoelectric exposure meter, an electric circuit in which said exposure meter is located, an indicator element for said photoelectric exposure meter, means forming part of said adjusting mechanisms for moving the indicator marks on the carriers and the indicator element of the photoelectric exposure meter to optical registration and for simultaneously continuously altering the resistance in the circuit of the photoelectric exposure meter in accordance with the movement of one of the carriers.

26. In a photographic camera, the combination of exposure control elements, adjusting mechanisms for the same, a rotary carrier of a plurality of indicator marks pertaining to one of said adjusting mechanisms, another rotary carrier of an indicator mark pertaining to another adjusting mechanism, a photoelectric exposure meter, an electric circuit in which said exposure meter is located, an indicator element for the same movable in an indicating field, means forming part of said adjusting mechanisms for moving one of the indicator marks on the first named rotatable carrier, the mark on another carrier and the indicator element to optical registration and for intermittently altering the resistance in the photoelectric circuit in accordance with the different marks of the first named carrier entering the indicating field.

27. In a photographic camera, the combination of exposure control elements, adjusting mechanisms for the same, a rotary transparent disc, a plurality of indicator marks circumferentially spaced on said disc, a second rotary transparent disc having an indicator mark, the disc being connected with the said adjusting mechanisms respectively, a photoelectric exposure meter, an electric circuit in which said exposure meter is located, an indicator element for the same, a plurality of resistances in said electric circuit, and means on the first named rotary disc for eliminating and inserting, respectively, said resistances in accordance with the approach of different marks on said first named disc to a position of optical registration with the mark on another carrier and with said indicator element.

28. In a photographic camera, the combination of a pair of exposure control elements, adjusting mechanisms for the same, a rotary transparent disc connected with one of said adjusting mechanisms and having a plurality of circumferentially spaced indicator marks thereon, another rotary transparent disc connected with the other adjusting mechanism, the first named disc being provided with an arcuate slot, a photoelectric exposure meter, an electric circuit in which said exposure meter is located, an indicator element for said exposure meter, a plurality of resistances in said electric circuit and means cooperating with the edges of the arcuate slot in the first named disc for altering the relation of said resistances to the electric circuit in accordance with the extent of rotation of said disc, said discs being adapted by their rotation to bring the indicator marks thereon to optical registration with the indicator element and to control the deflection of said indicator element.

29. In a photographic camera, the combination of exposure control elements, adjusting mechanisms for the same, a transparent rotary disc forming part of one of said adjusting mechanisms, said disc being provided with a plurality of circumferentially spaced indicator marks and with an arcuate slot having portions of different width, a rotary transparent disc provided with another indicator mark and connected with another adjusting mechanism, a photoelectric exposure meter, an electric circuit in which it is located, an indicator element for said photoelectric exposure meter, a switch member extending through the arcuate slot of said disc and operable differentially in the portions of different width of said arcuate slot, said switch member being adapted to alter the resistance of the electric circuit of the exposure meter in accordance with its position in portions of different width of said slot, said discs and the indicator element of the photoelectric exposure meter being rotatable about the same axis, and means forming part of said adjusting mechanisms for moving the indicator marks and the indicator element to optical registration while at the same time altering the resistance conditions of the electric circuit of the photoelectric exposure meter.

30. In a photographic camera, the combination of a camera housing, exposure control elements, adjusting mechanisms for the same, carriers of indicator marks movable by said adjusting mechanisms, an exposure meter, an indicator element for the same, actuating means for said adjusting mechanisms operative upon said carriers, which actuating means project from the housing of the camera, and means forming part of said adjusting mechanisms for moving the indicator marks on the carriers and the indicator element of the exposure meter to optical registration.

31. In a photographic camera, the combination of a camera housing, exposure control elements, adjusting mechanisms for the same, carriers of indicator marks movable by said adjusting mechanisms, an exposure meter, an indicator element for the same, actuating means for said carriers projecting from said housing in such relation that they are adapted to be operated simultaneously by the same hand, said actuating means forming part of said adjusting mechanisms for moving the indicator marks of the carriers and the indicator element of the exposure meter to optical registration with each other.

32. In a photographic camera, the combination of a camera housing, exposure control elements, adjusting mechanisms for the same, carriers of indicator marks movable by said adjusting mechanisms, an exposure meter, an indicator element for the same, means forming part of said adjusting mechanisms for moving the indicator marks and the indicator element to optical registration, when viewed from the top of the camera housing while the camera is in operative position.

33. In a photographic camera, the combination of a camera housing, a lens mount exchangeably secured to the camera housing, exposure control elements, adjusting mechanism for the same, carriers of indicator marks movable by said adjusting mechanisms and connected with the exchangeable lens mount, an exposure meter supported by the exchangeable lens mount, an indicator element for the exposure meter, and means forming part of said adjusting mechanisms for moving the indicator marks on the carriers and the indicator element of the exposure meter to optical registration.

34. In a photographic camera, the combination of a camera housing, exposure control elements, adjusting mechanisms for the same, carriers of indicator marks movable by said adjusting mechanisms, an exposure meter, an indicator element for the same, actuating means for said adjusting mechanisms operative upon said carriers, which actuating means project from the housing of the camera, and means forming part of said adjusting mechanisms for moving the indicator marks on the carriers and the indicator element of the exposure meter to optical registration, the carriers having numerical indicia additionally to the said indicator marks, and the housing being provided with openings through which the additional indicia may be observed.

HUBERT NERWIN.